May 11, 1937.  R. F. PEO  2,079,869
THERMOSTATIC VALVE ASSEMBLY
Filed Sept. 21, 1935   2 Sheets-Sheet 1
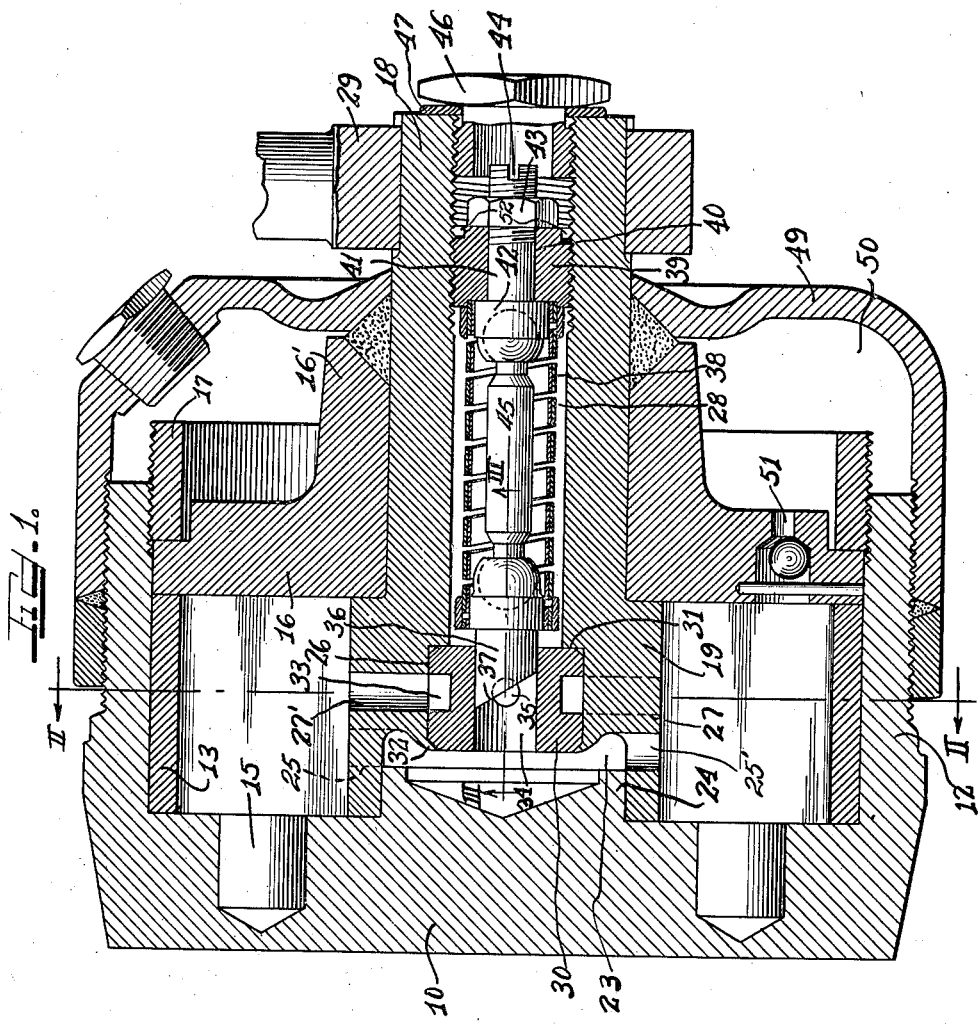
Inventor
Ralph F. Peo.

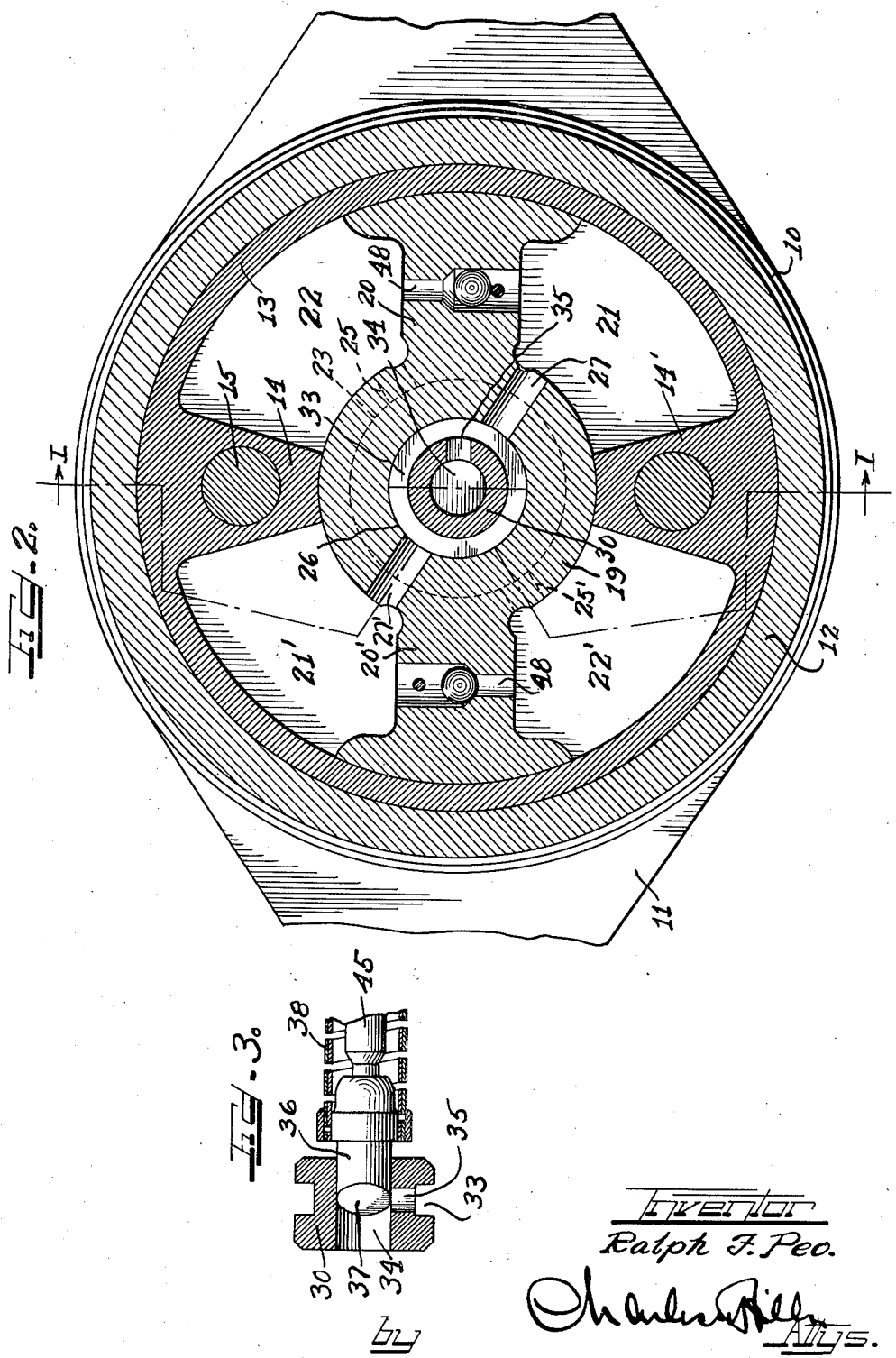

Patented May 11, 1937

2,079,869

UNITED STATES PATENT OFFICE 2,079,869

THERMOSTATIC VALVE ASSEMBLY

Ralph F. Peo, Buffalo, N. Y., assignor to Houde Engineering Corporation, Buffalo, N. Y., a corporation of New York Application September 21, 1935, Serial No. 41,550

5 Claims. (Cl. 188—100)

My invention relates to thermostatic valve assemblies adapted particularly for use in hydraulic shock absorbers for controlling the flow of the displaced hydraulic fluid.

An important object of the invention is to provide a thermostatically movable valve having a biased or diagonally extending end for cooperation with a port to regulate the flow therethrough as the valve is moved by the thermostat.

Another important object is to provide improved anchorage means for one end of the thermostat coil whose other end is connected with the valve, with the anchorage means manually adjustable for setting of the biased end of the valve relative to the port either axially or rotatively or both.

The above-referred to and other features of the invention are incorporated in the structure disclosed on the drawings, in which drawings Figure 1 is a diametral section of a hydraulic shock absorber on plane I—I of Figure 2 showing my improved valving assembly applied;

Figure 2 is a section on plane II—II of Figure 1; and

Figure 3 is a section on plane III—III of Figure 1.

I have shown my improved valving assembly applied to a hydraulic shock absorber which may be of the type disclosed in Fox et al. Patent No. 2,004,752, dated June 11, 1935. Briefly describing the shock absorber structure, it comprises a cup-shaped housing whose base 10 has ears 11 thereon whereby the housing may be secured to a support as for example the chassis of an automotive vehicle. Fitting into the annular wall 12 of the housing is the ring 13 having the partition lugs 14 and 14' extending radially inwardly therefrom, the ring being secured in place by pins 15 extending through the partition lugs and into the base 10.

A wall structure 16 extends into the end of the annular wall 12 to abut the ring 13 and the partition lugs, and the wall is secured by an annular nut 17 threading into the wall 12. The wall 16 and its extension 16' form a bearing for the shaft 18 whose hub portion 19 extends between the wall 16 and the base 10 and has the vanes 20 and 20' extending therefrom, the hub and the vanes and the partition lugs dividing the space within the ring 13 into high pressure working compartments 21 and 21' and low working compartments 22 and 22'.

At its inner end the shaft has the recess or bore 23 receiving the bearing lug 24 on the base 10 for journaling the shaft at its inner end. The inner recess or chamber 23 is connected with the low pressure working chambers 22 and 22' by passages 25 and 25' respectively. The intermediate bore 26 in the shaft hub which is of smaller diameter than the inner bore 23, is connected with the high pressure working chambers 21 and 21' by passages 27 and 27' respectively. The bore portion 28 through the shaft is of less diameter than the intermediate bore 26 and extends from the intermediate bore to the exterior of the shaft at the outer end thereof.

At the outer end of the shaft is secured a lever 29 for connection with the axle of the vehicle so that during relative movement between the vehicle body and axle the shaft structure will be oscillated for displacement of the fluid in the hydraulic working chamber.

Describing now my improved valving assembly, it comprises a bushing 30 which fits into the intermediate bore 26 against a shoulder 31 and is held in place as by peening the metal at the inner end of the bore against the outer side of the bushing as indicated at 32. The bushing has the circumferential channel 33 which is in alignment with the passages 27 and 27' connecting with the high pressure working chambers, and the cylindrical bore 34 extending axially through the bushing is connected by a port 35 with the circumferential channel 33.

A cylindrical valve plug 36 extends into the bushing bore and has its inner end cut away on the bias as indicated at 37 whereby the end face of the valve is in a plane at an angle with the valve axis, this biased end of the valve cooperating with the port 35 for regulation of the flow of the displaced hydraulic fluid as the piston structure oscillates.

The outer end of the valve plug extends into the outer shaft bore 28 and has secured thereto the inner end of a thermostat coil 38. Anchorage means is provided for the other end of the thermostat coil by means of which the setting of the valve relative to the port may be readily and accurately manually accomplished. Such anchorage means comprises a supporting member 39 in the form of a plug having threaded engagement in the outer end of the shaft bore and this plug has an axial bore 40 for receiving the stem 41 extending from a head 42 to which head the thermostat coil 38 is secured at its outer end. The outer end of the stem 41 is threaded to receive a lock nut 43 whereby the thermostat supporting head may be locked to the plug.

By means of the anchorage arrangement described accurate manual adjustment of the valve relative to the fluid regulating port 35 may be accomplished; by loosening the lock nut 43 the head 42 may be turned as by the application of a screw driver in the slot 44 in the end of the head stem, such turning of the head being communicated thru the thermostat coil to the valve plug for rotation thereof and corresponding setting of its biased end relative to the regulating port. After such setting the lock nut is again tightened.

The valve could also be manually set by rotating of the plug 39 and to facilitate rotation of the plug it may be provided with tool receiving recesses 52. When the plug is rotated while the head 40 is secured thereto by the lock nut, then the valve plug will be given a combined axial and rotary movement for setting relative to the regulating port. If the plug is turned after loosening of the lock nut, then the valve will be given only an axial movement. Thus, by the anchorage means shown, the valve manual setting may be either by only axial movement thereof, or only rotational movement thereof, or by a combined axial and rotational movement, and accurate adjustment is thus possible. In order to relieve the delicate thermostat coil of strain, the valve plug and the head 42 may be spanned by a rod 45 having preferably universal coupling connection therewith. With such universal coupling connection the valve plug is also free to accurately seat in the bushing bore and to turn easily with the thermostat coil as the coil responds to temperature changes. At the same time the connecting rod between the valve and head will take up any axial pressure strain against the valve and the thermostat coil.

A closure plug 46 is preferably provided for the outer end of the shaft bore with a sealing gasket 47 interposed between the plug head and the shaft end to prevent escape of any fluid from the bore. The closure plug may be hollow to receive the outer end of the stem 41.

The operation of the shock absorber structure shown is apparent. During rebound movements of the vehicle springs the fluid will be displaced from the high pressure working chambers 21 and 21' through the passages 27 and 27' into the circumferential channel of the bushing 30 and from there the fluid will flow through the port 35 past the valve plug and then through the chamber 23 and passages 25 and 25' to the low pressure working chambers 22 and 22'. During compression movement of the vehicle springs the fluid will flow through the same path from the low pressure chambers to the high pressure chambers and to decrease the shock absorber resistance during such compression movement of the vehicle springs check valve controlled passages 48 are provided in the piston vanes 20 and 20'.

As the temperature in the shock absorber changes, the thermostat coil will respond and will rotate the valve plug for greater or less overlap by its biased end of the regulating port 35 so as to maintain the proper shock absorber resistance independently of temperature change.

The cup-shaped frame 49 extending between the annular wall 12 and the outer end of the bearing extension 16' provides a fluid reservoir 50 from which replenishing fluid flows to the working chambers by way of check valve controlled passages 51.

I have shown a practical and efficient embodiment of the various features of my invention, but I do not desire to be limited to the exact construction, arrangement and operation shown and described, as changes and modifications may be made without departing from the scope of the invention.

I claim as my invention:

1. A thermostat valve assembly for hydraulic shock absorbers comprising a seat member having a bore and a port leading thereto, a valve in said bore for cooperating with said port, a head in axial alignment with said valve, a thermostat coil secured at its ends to said valve and head respectively, an anchorage member for said head on which said head is rotatable whereby it may be manually turned for rotational setting of said valve relative to said port, and means for causing axial shift of said anchorage member for manual longitudinal setting of said valve relative to said port, said thermostat coil responding to temperature change to rotatably adjust said valve automatically.

2. A thermostatic valve assembly for hydraulic shock absorbers comprising a seating member having a bore and a port leading thereto, a valve in said bore for cooperating with said port to control the fluid flow therethrough, a thermostat coil secured at one end to said valve, and anchorage means for the other end of said coil adjustable for either rotary or axial movement of said valve or both of said movements for manual setting of said valve relative to said port, said thermostat coil being operable to automatically adjust said valve in accordance with change in temperature.

3. A valving assembly for controlling the hydraulic fluid flow in a hydraulic shock absorber having a bored shaft supporting vanes for displacing hydraulic fluid, said valving assembly comprising a seat member at one end of the shaft bore having a valve chamber and a port communicating therewith for the flow of displaced hydraulic fluid, a valve in said valve chamber for cooperating with said port to regulate the flow, a thermostat coil in said bore connected at one end with said valve, and anchorage means in said shaft bore for the other end of said coil, said anchorage means being manually adjustable for setting of said valve relative to said port either rotatably or axially or both, said thermostat coil operable to automatically set said valve in accordance with temperature change.

4. A valving assembly for controlling the hydraulic fluid flow in a hydraulic shock absorber having a bored shaft supporting vanes for displacing hydraulic fluid, said valving assembly comprising a seat member at one end of the shaft bore having a valve chamber and a port communicating therewith for the flow of displaced hydraulic fluid, a valve in said valve chamber for cooperating with said port to regulate the flow, a thermostat coil in said bore connected at one end with said valve, and anchorage means in said shaft bore for the other end of said coil, said anchorage means comprising a supporting member having threaded engagement in said bore, a head to which the other end of said coil is secured, a stem on said head rotatable in said supporting member, and locking means for securing said head against rotation.

5. A thermostatic valve assembly for hydraulic shock absorbers comprising a seating member having a bore and a port leading thereto, a cylindrical valve plug having its end face inclined and being rotatable and shiftable in said bore for cooperation of said inclined end with said port to regulate the flow therethrough, a thermostat coil secured at one end to said valve plug, anchorage means for the other end of said coil adjustable manually for either rotary or axial movement of said valve or both of said movements for manual setting of said valve relative to said port, said thermostat coil being operable to automatically rotatably adjust said valve in accordance with change in temperature, and a stem between said valve and anchorage means arranged to prevent longitudinal shift of said valve by said thermostat coil after manual setting of said valve.

RALPH F. PEO.